Oct. 5, 1943.  E. G. K. ANDERSON  2,330,942
ELECTRICAL FIXTURE
Filed April 11, 1942
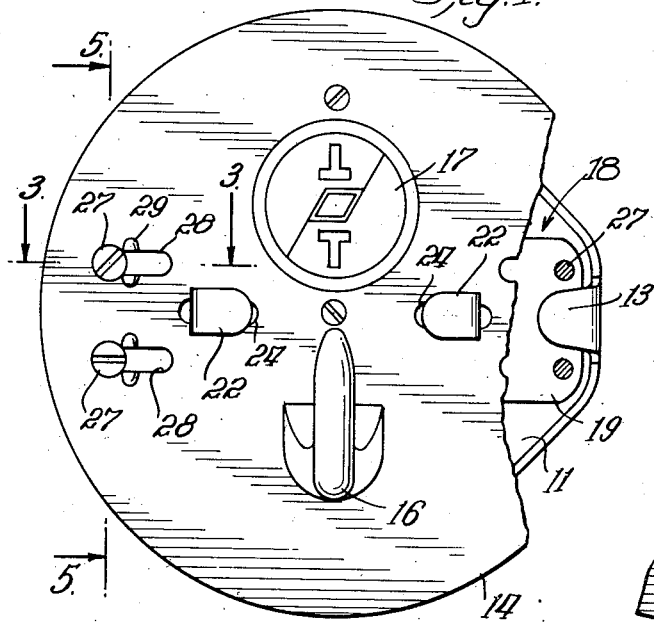
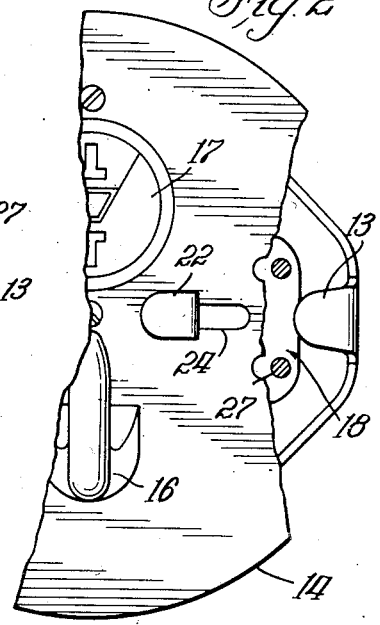
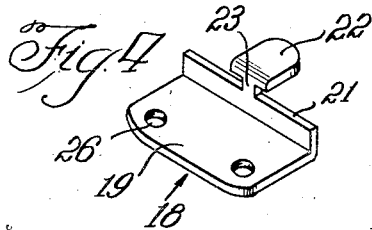
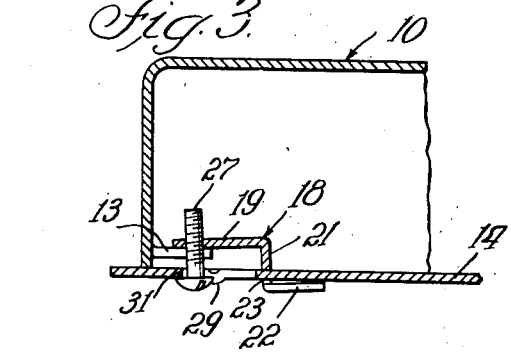
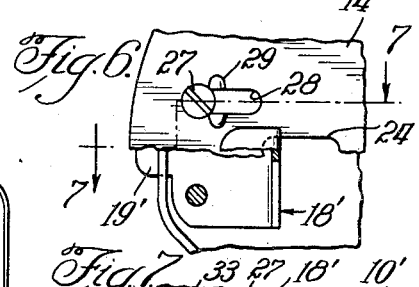
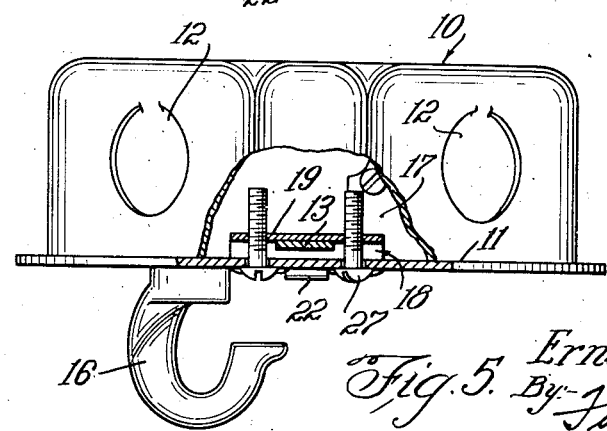
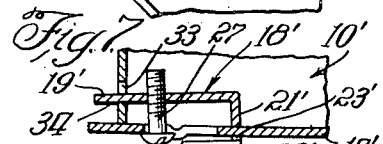
Inventor:
Ernst G. K. Anderson
By Foorman L. Mueller
Atty.

Patented Oct. 5, 1943

2,330,942

UNITED STATES PATENT OFFICE 2,330,942

ELECTRICAL FIXTURE

Ernst G. K. Anderson, Chicago, Ill.

Application April 11, 1942, Serial No. 438,541

9 Claims. (Cl. 174—61)

This invention relates to electrical fixtures and in particular to a conduit fitting adapted to have electrical means suspended therefrom.

The usual conduit fitting or box in the prior art adapted to have an electrical unit suspended therefrom generally includes a housing with an opening in one side thereof permitting access to electrical connections within the housing. The housing is provided at the opening with a pair of integrally formed lug or ear portions, oppositely arranged and projecting inwardly of the housing toward each other. Each lug is usually provided with a threaded aperture adapted for threaded engagement with a corresponding screw extended through a cover for closing the housing opening, the cover being adapted for connection with the suspended unit. The entire weight of the electrical unit is thus carried only on the two screws. Since it is customary to suspend electrical fixtures having weights in the neighborhood of from 75 to 100 pounds the screw threads are frequently stripped or torn loose from the lugs by the imposition of this load thereon thus permitting the electrical unit to drop. This of course is dangerous not only because of the possible shorting of the electrical connections in the housing and the resultant fire hazard, but because of the probable injury to the unit and to any persons who might be struck thereby when it fell. A further objection to these prior art conduit fittings is the fact that the entire weight of the electrical unit must generally be supported adjacent the conduit fittings while the screws are initially threaded in the housing lugs. This of course is very inconvenient particularly when the electrical unit is bulky or heavy.

It is an object of this invention, therefore, to provide an improved and sturdier electrical apparatus for suspending an electrical unit.

Another object of this invention is to provide electrical apparatus including a housing portion and a cover therefor having means for quickly and easily interconnecting the housing and cover so that large or small loads can be supported from the cover without the cover pulling away from the housing.

A further object of this invention is to provide a conduit fitting having a housing and a cover member in which means for supporting the cover from a plurality of supporting portions on the housing distribute the load of any weight carried on the cover over a plurality of holding members operatively connecting the cover and the supporting portions, and over a plurality of parts of each holding member.

A feature of this invention is found in the provision of a conduit fitting having a housing with a plurality of supporting portions and an opening in one side thereof, and a cover for the housing opening having corresponding engaging portions movable into operative connection with the corresponding supporting portions to support the cover thereon, said engaging portions each being connected at a plurality of points with the cover to distribute the load suspended from the cover over said plurality of point connections.

Another feature of this invention is the provision of a fixed conduit box or fitting with a plurality of fixed supporting portions, and a cover adapted to be mounted on the box or fitting having corresponding longitudinally slidable or movable parts, each with a lip thereon for mechanical engagement with a corresponding supporting portion.

Further objects, features, and advantages of this invention will become apparent from the following description when taken in connection with the accompanying drawing in which:

Fig. 1 is a bottom plan view of a complete assembly of this invention with parts of the cover being broken away to more clearly show its assembly with the conduit housing;

Fig. 2 is a fragmentary view illustrated similarly to Fig. 1 showing parts thereof in changed positions;

Fig. 3 is a fragmentary sectional view as seen along the line 3—3 in Fig. 1;

Fig. 4 is a view in perspective of one of the cover engaging portions;

Fig. 5 is an elevational view taken approximately along the line 5—5 in Fig. 1 with parts thereof being broken away to more clearly show the assembly relation of the cover and housing;

Fig. 6 is a fragmentary bottom plan view of a modified embodiment of the invention; and Fig. 7 is a cross-sectional view along the line 7—7 of Fig. 6.

In the practice of this invention there is provided a usual conduit box having an open side and a plurality of spaced supporting portions on the box wall adjacent the open side. A cover for the open housing side is provided with a plurality of brackets or engaging portions corresponding to the lug portions. Each of the brackets is slidably connected at one end on the cover and adapted to be spaced therefrom at the other end. On movement of a bracket into a position for engaging a corresponding supporting portion, the supporting portion is received between a lip of the bracket and the cover so that the cover is supported thereon. Each slidable bracket includes a pair of screws slidable therewith in the cover, with the heads extended therethrough so as to be accessible on the outside of the cover. In addition each bracket includes a tail portion on the outside of the cover and integral with the body portion of the bracket which also includes a lip, with such body portion and lip being on the other side of the cover. On tightening of the screws the supporting portion is clamped between a corresponding bracket and the cover. As a result the weight applied on the cover is carried on the housing supporting portions, and is distributed through each bracket at the lip to the clamping screws, and the tail portion of each. Any weight suspended from the cover is thus distributed at each bracket therefor over at least three points including the two connecting screws and the slidable connection or tail portion, so as to eliminate load concentration at any one point.

Referring to the drawing there is shown in Figs. 1 and 5 a conduit fitting adapted to have an electrical unit (not shown) suspended therefrom. The fitting includes a housing or body portion 10 of a usual type having an open side 11 and "knockout" portions 12 adapted to be punched out for inserting electrical connections within the housing. A pair of lug or ear portions 13 integrally formed with the housing 10 are oppositely arranged at the open side 11 and bent inwardly of the housing toward each other. In the use of conduit fittings of this type it is customary to suspend the electrical unit from a housing cover for closing the open side 11. The cover 14 (Fig. 1) carries a hook portion 16 and an electric receptacle or socket 17 for receiving an electric plug (not shown) electrically connected with the unit to be suspended. As previously mentioned, in the prior art conduit devices the cover generally is secured to the lugs 13 by merely screwing the cover thereto, a single screw usually being connected with each lug. As a result the entire weight of the electrical unit supported from the conduit cover is carried by such two screws with the resultant disadvantages above noted.

In the present invention the cover 14 is provided with a pair of bracket units or members 18 (Figs. 1 and 4) corresponding to the lug portions 13. Since each assembly of a bracket member 18 with a corresponding lug 13 is the same, only one of such assemblies will be referred to in the following detailed description. The bracket 18 is integrally formed by a simple punching or stamping operation and includes a body portion of substantially L-shape having leg portions 19 and 21. Bent laterally outwardly from the bracket 18 at the free end of the leg portion 21 is an ear or tail portion 22 connected with the leg 21 through a reduced section 23. In the assembly of the bracket 18 with the cover 14 the ear 22 is inserted through a slot 24 provided in the cover 14, the reduced section 23 providing a dove-tailed engagement of the bracket 18 with the cover 14 in a manner which is believed to be obvious from the drawing. By virtue of this engagement of the bracket 18 in the cover 14, the leg 19 of the bracket, or lip as it might also be called, is spaced laterally from the cover 14 by the leg 21, and pivotally movable relative to the cover between limits defined by the dove-tail engagement. The bracket is thus slidably connected with the cover, with the slidable connection permitting movement of the bracket leg 19 laterally or longitudinally of the cover.

The slot 24 is positioned relative to the lug 13, when the cover is in place, and is of a length so as to define or limit a slidable movement of the bracket leg 19 into and out of an engaging position with the lug. Thus as shown in Figs. 1 and 3 the cover 14 in a closing position for the open side 11 of the housing 10 is positioned opposite one side of the lug 13. The leg 21 of the bracket 18 is of a length adapted to space the leg 19 or engaging lip from the cover 14 so that the lug 13 is received within such space on slidable movement of the bracket 18 toward the right, as viewed in Fig. 2, to its position shown in Fig. 1. With the leg 19 thus moved to an overlying position relative to the lug 13 the cover 14 is supported from the lug through the bracket 18. When the bracket is in a position slightly to the left from that indicated in Fig. 2 the leg 19 is capable of being moved out of an engaging or overlying position with the lug 13 to permit removal of the cover 14 from the housing 10.

The lip or engaging portion 19 of the bracket 18 is formed with a pair of spaced threaded apertures 26 adapted for operative connection with screws 27 extended through the cover 14 and slidably movable in corresponding slots 28 provided therein. The screws 27 are arranged to pass on opposite sides of the lug 13 so as not to interfere in any way with the movement of the bracket 18 into a position for supporting the cover 14 therefrom.

In the assembly of the cover 14 with the housing 10 a bracket 18 is initially located in its position just slightly to the left of that indicated in Fig. 2 with the leg or lip 19 in a non-engaging position relative to a lug 13 and the cover 14 against the open side 11 of the housing 10. With the cover thus positioned the bracket 18 is slidably moved to its position in Fig. 1 with the leg 19 above the lug 13. It is to be understood of course that the screws 27 although extended through the bracket 18 and cover 14 are loosened so as to permit a free movement of the bracket to its engaging position with the lug 13. With a lug 13 and bracket 18 thus assembled it is apparent that the cover 14 is retained in a supported position on the lugs by simply sliding the brackets thereover and without requiring any tightening of the screws 27. This initial support of the cover 14 provides for a very easy assembly of the cover regardless of whether or not an electrical unit is attached thereto during such assembly. In other words the inconvenience usually encountered in the prior art devices of supporting the cover 14 with one hand while attempting to locate a screw in a threaded aperture in the housing 10 with the other is entirely eliminated, since both hands may be used to accomplish the initial support of the cover.

In order to positively retain the bracket 18 in a cover supporting position the screws 27 are tightened so as to clamp the lug 13 between the bracket 18 and the cover 14. To prevent any sliding of the bracket 18 out of its engaging position with the lug 13 there is provided at each side of a slot 28 a bumped-out stop or retaining portion 29 which are spaced from the end 31 (Figs. 1 and 3) of a corresponding slot 28 a distance adapted to receive the head of a screw 27 between such stops and the slot end 31. When the bracket 18 is initially moved to its engaging position with a lug 13 the screws 27 are loosened sufficiently so as to be lifted over the stops 29. Because of the pivotal movement of the bracket leg 19 in a direction laterally of the cover 14 the screws 27 are readily lifted to clear the stops 29. On tightening of the screws 27 the heads thereof are prevented from passing over the stops so that movement of the screws 27 is limited in one direction by the end 31 of a corresponding slot 28 and in an opposite direction by the stops 29.

By virtue of this construction of the cover 14 and its relative assembly with the lugs 13 the weight carried or suspended from the hook portion 16, or in any other manner from a cover for a conduit box or fitting, is accepted by the lip 19 and lug 13 connection and distributed substantially uniformly over the entire bracket 18. It is divided somewhat equally over the screws 27 and the slidable connection at the ear or tail 22. Since each bracket 18 is connected in at least these three points with the cover 14 there is provided six connecting points for supporting the cover and the electrical unit suspended therefrom from the two lugs 13 as compared to only the two connecting screws in the prior art structures with the same number of lugs. As a result, no portions of the connecting means between the cover 14 and the housing 10 are subjected to any excessive loading which might impair the holding function thereof. It is to be noted further that the screws 27 are always extended through the bracket leg, engaging portion or lip portion 19, as it may be called, so that there is no fumbling in aligning a screw with a corresponding threaded aperture after the cover is in position against the housing 10.

A modified embodiment of the invention is illustrated in fragmentary form in Figs. 6 and 7. Fig. 6 corresponds in general to Fig. 1, and only a fragmentary portion of a bracket assembly and corresponding part of conduit housing is illustrated, because the remainder of the structure is evident from Fig. 1 and the preceding description. Fig. 7 corresponds to Fig. 3, and shows the modified structure with the slidable bracket in a supported position relative to the fixed conduit box therefor. The modified embodiment includes a plurality of bracket members 18', each of which includes an engaging or lip portion integral with the body portion thereof, a spacing leg 21' with a neck portion 23', and a tail portion 22' integral with the neck portion 23'. The neck portion 23' dove-tails with a corresponding slot 24 in the cover 14', and the tail portion 22' instead of extending laterally or longitudinally in a direction oppositely disposed to the body portion of the bracket, as in Fig. 3, extends in the same general direction as the body portion including the lip or engaging portion 19'. In the event that the fitting or fixture connected to the cover 14 or a receptacle or socket therein, requires a considerable area over the face of the cover, the bracket 18' with the tail portion 22' extending in the direction illustrated provides more free space in the center portion of the cover.

The structure of Figs. 6 and 7 illustrates a simplified conduit box 10' with the wall thereof uniform over its circumference as contrasted to the irregular configuration caused by the protruding lugs 13 of the structure of Fig. 1. A plurality of apertures 33 are provided in the housing wall spaced inwardly from the circumferential edge as shown in Fig. 7, to provide a supporting portion 34 for engagement by the lip 19 of the bracket. The screws 27 and the tail portion 22' of each bracket assembly act in the same manner as corresponding structure in the first described embodiment. When the screws 27 are tightened against the face of the cover 14', the lip or engaging portion 19' is drawn down against the supporting portion 34 of the box or housing. Consequently the load applied to the cover by a fixture or the like supported therefrom, is accommodated at the lip 19' and supporting portion 34 connection, but is distributed over the three points or portions including the screws and the bracket at the tail portion, as heretofore described with reference to the structure of Fig. 1.

From a consideration of the above description and drawing, therefore, it is seen that the invention in the embodiment of Fig. 1 provides a conduit fitting having a cover adapted to have an electrical unit suspended therefrom in which the load supported from the cover is distributed over a plurality of brackets, and a plurality of points in each bracket for supporting the cover from the conduit housing. The engaging portion 19 of each bracket 18 overlies substantially an entire side of a corresponding lug 13 to provide for a large engaging surface therebetween. The brackets 18 are readily movable into and out of engaging positions with the lugs 13 and capable of initially supporting the cover 14 from the lugs prior to the locking of the cover in its final assembly position.

In the embodiment of Fig. 6, the engaging portion, or lip, 19' of each bracket member 18' extends through the aperture 33 in the wall of the housing or box 10' and engages the supporting portion, or aperture wall 34. These brackets are movable in the same manner as the brackets of the first-described embodiment and are readily clamped in a supporting position.

Although the invention has been specifically described with reference to preferred embodiments thereof, it is to be understood that modifications and alterations can be made therein which are within the full intended scope of this invention as defined by the appended claims.

I claim:

1. Electrical apparatus adapted to have electrical structure suspended therefrom including a plurality of spaced apart supporting portions, a plate member adapted to be positioned opposite one side of said supporting portions having a load carrying portion thereon for connection with said structure, a corresponding plurality of units movable substantially longitudinally of the plate member and supported thereon, each having an engaging portion movable therewith into an interconnecting position with a corresponding supporting portion to support said plate thereon, and a plurality of means including adjustable means corresponding to each unit for connecting a corresponding engaging portion with said plate, with any load carried on said plate being applied on an engaging portion through the said plurality of connecting means corresponding thereto.

2. In electrical fitting apparatus having a housing unit and a load carrying cover unit adapted to be releasably locked together, the means for locking said units together including a plurality of supporting portions on one of said units, and a corresponding plurality of connecting means on the other of said units movable relative to said other unit to a locking position with a corresponding portion on said one unit, each of said connecting means including a lip portion and a plurality of portions connecting said lip portion with said other unit, with a lip portion being movable with a corresponding connecting means in a substantially longitudinal direction relative to the other unit into locking engagement with a corresponding supporting portion, with one of said plurality of portions corresponding to a connecting means being adjustable to clamp a corresponding lip portion in releasably locked engagement with a corresponding supporting portion.

3. A conduit fitting adapted to have electrical means suspended therefrom including a body portion having an open side with a pair of oppositely arranged lugs at said open side extended inwardly toward each other, a cover plate for said open side having a load carrying portion thereon for connection with said electrical means, a pair of slidable members corresponding to said lugs, each said slidable members having an end portion thereof slidably supported on said cover, with the opposite end portion of a slidable member being spaced from said cover and movable, on slidable movement of said slidable member, into an overlying position with a corresponding lug to support the cover thereon, and a plurality of adjustable means corresponding to each said slidable members connecting a corresponding opposite end portion with said cover plate and adjustable to maintain said opposite end portion fixed in said overlying position with a corresponding lug, with a load on said cover plate being applied to a lug through the end portion of a slidable member and adjustable means corresponding to said lug.

4. A conduit fitting adapted to have an electrical unit suspended therefrom including a body portion having an opening in one side with a pair of lug portions at said one side extended inwardly toward each other, the cover for said opening having a portion thereon adapted for connection with said electrical unit, a pair of bracket members of substantially L-shape corresponding to said lugs, each said bracket members having one leg portion extended substantially parallel with said cover, and another leg portion slidably connected with said cover, with said one leg portion spacing said other leg portion from said cover, each of said bracket members being slidably movable relative to said cover to position a corresponding lug portion between said cover and a corresponding one of said one leg portions to support the cover from said lug portion, a plurality of adjustable members corresponding to each bracket member connected with said cover at a corresponding one leg portion to clamp said one leg portion against the corresponding lug portion, said adjustable members being extended through said cover and slidably movable therein, with the weight of said electrical unit being distributed over the adjustable members and a slidable connection corresponding to each of said bracket members, and means including said adjustable members retaining said bracket members against movement relative to said lug portions from a cover supporting position.

5. An electric conduit structure adapted to have an electrical unit suspended therefrom including a body portion having an opening in one side thereof, said body portion having a plurality of supporting portions at said opening extended inwardly toward each other, a cover for said opening having an engaging portion thereon for connection with said electrical unit, a plurality of connecting members corresponding to said supporting portions movable relative to said cover, with a connecting member having one end thereof movably supported on said cover, and an opposite end movable, on movement of said connecting member relative to said cover, into an over-lying position relative to a corresponding supporting portion, and means for drawing the opposite end of each said connecting members toward said cover and against a corresponding supporting portion to retain the same in fixed relative positions.

6. A conduit fitting including a body portion having an opening in one side thereof with a plurality of supporting portions adjacent said opening, a cover for said opening having a plurality of lip portions thereon corresponding to said supporting portions, and means slidably supporting said lip portions on said cover for movement substantially longitudinally of said cover into an engaging position with a corresponding supporting portion, said cover in a closing position relative to said open side being positioned at one side of said supporting portions with each said lip portions at said engaging position being located to the other side of a corresponding supporting portion to support the cover thereon, and means operatively connected with each said lip portions and cover for retaining a lip portion against the other side of a corresponding supporting portion and for carrying a portion of any load on said cover and applied to a lip portion and corresponding supporting portion.

7. Electrical apparatus adapted to have electrical means suspended therefrom including a housing portion having an open side with a pair of lug portions at said open side extended inwardly toward each other, a cover for said open side having a portion thereof adapted for connection with said electrical means, a pair of engaging portions on said cover corresponding to said lugs, means slidably connecting said engaging portions with said cover for longitudinal movement relative to said cover, said cover in a closing position relative to said open side being opposite one side of said lugs, with said longitudinal movement of an engaging portion, when said cover is in said closing position, positioning said engaging portion adjacent the other side of a corresponding lug, and a plurality of screws connecting each said engaging portions and said cover to clamp an engaging portion against the other side of a corresponding lug to support the cover thereon, with the weight of said electrical means being distributed over the slidable connecting means and screws corresponding to each engaging portion.

8. In an electrical fixture, the combination including a walled conduit box open at one side and having a plurality of apertures in the wall, a cover, and a plurality of connecting means for the cover and box movably supported on the cover for movement substantially longitudinally of the cover, each said connecting means including an engaging portion on one side of the cover and a tail portion on the other side thereof, with each of said connecting means being movable to a position at which an engaging portion is extended into a corresponding wall aperture to retain the cover on said box.

9. In an electrical fixture, the combination including a conduit box having a plurality of supporting portions, a cover, and a plurality of means for connecting the cover and box, each means including a bracket having an engaging portion on one side of the cover, a tail portion on the other side of the cover, and a connection between said two portions movable in a corresponding opening in said cover to provide for movement of said bracket substantially longitudinally of said cover to a position at which an engaging portion is in a supporting position relative to a corresponding supporting portion on said conduit box, and screw means having a head portion on said other side of said cover and a body portion extending through the cover for threaded engagement with the bracket at the engaging portion.

ERNST G. K. ANDERSON.